US011119975B2

(12) United States Patent
Bland et al.

(10) Patent No.: US 11,119,975 B2
(45) Date of Patent: Sep. 14, 2021

(54) DIGITAL DESIGN APPLICATION PLUGIN FOR CONTENT UPDATES AND DELIVERY

(71) Applicant: MASTERCARD INTERNATIONAL INCORPORATED, Purchase, NY (US)

(72) Inventors: Paul Bland, Ridgewood, NY (US);
Amin Nassiri, Brooklyn, NY (US);
Melinda Belcher, Brooklyn, NY (US);
Jason Eckert, Deer Park, NY (US);
Selene Noel Rosenberg, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 181 days.

(21) Appl. No.: 16/438,368

(22) Filed: Jun. 11, 2019

(65) Prior Publication Data

US 2020/0394152 A1  Dec. 17, 2020

(51) Int. Cl.
*G06F 16/00* (2019.01)
*G06F 16/11* (2019.01)
(Continued)

(52) U.S. Cl.
CPC .......... *G06F 16/116* (2019.01); *G06F 16/13* (2019.01); *G06F 16/176* (2019.01)

(58) Field of Classification Search
None
See application file for complete search history.

(56) References Cited

U.S. PATENT DOCUMENTS

| 10,248,664 B1* | 4/2019 | Shen .................... G06N 3/0454 |
| 2004/0102931 A1* | 5/2004 | Ellis ...................... H04W 4/024 |
| | | 702/188 |

(Continued)

OTHER PUBLICATIONS

David Williames, "Sync content within a Google Sheets document, to text layers—based on their names. Edit and collaborate on your content in Google Sheets, then sync in back to your sketch files", https://github.com/DWilliames/Google-sheets-content-sync-sketch-plugin, Accessed Nov. 2, 2018, 6 pages.

(Continued)

*Primary Examiner* — Bai D Vu
(74) *Attorney, Agent, or Firm* — Talem IP Law, LLP (57) ABSTRACT

A digital design application plugin for content updates and delivery includes an export function and an import function. The export function extracts content items from a specified SKETCH file to a named file having a different file format, each content item having a path and one or more identifiers. In response to receiving a request to import from the named file to the specified SKETCH file, the import function updates the specified SKETCH file by parsing the named file for the path and the one or more identifiers; traverses the specified SKETCH file according to the path obtained from the named file for that content item; compares identifiers associated with that content item and the content itself to identify any changes from the named file; and modifies the content of the specified SKETCH file with the changes as indicated by the named file.

15 Claims, 6 Drawing Sheets

(51) Int. Cl.
    *G06F 16/13*     (2019.01)
    *G06F 16/176*     (2019.01)

(56) References Cited

U.S. PATENT DOCUMENTS

| | | | |
|---|---|---|---|
| 2007/0044639 A1* | 3/2007 | Farbood | G10H 1/0025 |
| | | | 84/609 |
| 2007/0286458 A1* | 12/2007 | Podilchuk | G06K 9/3241 |
| | | | 382/103 |
| 2008/0098005 A1* | 4/2008 | Goradia | G06F 16/9535 |
| 2014/0313216 A1* | 10/2014 | Steingrimsson | G06K 9/00402 |
| | | | 345/589 |
| 2017/0277665 A1* | 9/2017 | Hansmann | G06F 16/986 |
| 2019/0018660 A1* | 1/2019 | Ananthapur Bache | ...... |
| | | | G06K 9/00422 |
| 2020/0073968 A1* | 3/2020 | Zhang | G06N 3/08 |

OTHER PUBLICATIONS

"Fill your Sketch designs with live data from Google Spreadsheets and Microsoft Excel", https://github.com/cloudstitch/cloudstitch-sketch-plugin, Accessed Nov. 2, 2018, 10 pages.

* cited by examiner

DIGITAL DESIGN APPLICATION PLUGIN FOR CONTENT UPDATES AND DELIVERY

BACKGROUND

A common pain point in many organizations is the sharing of content between design, engineering and content teams. This process often falls back on relatively primitive tools like a word processing document with track changes, or an endless stream of emails or chat messages with tweaks and updates. In addition, in a collaborative project, creating a single source of truth for multiple edit instances can be helpful, particularly when sharing content between content and design/user experience teams.

There is an increasing need within design teams to develop workflow automation tools to simplify, speed up and streamline various design processes, especially in the continuous delivery of agile workflows.

SKETCH from Bohemian Coding is a digital design application that is popular with designers. However, there can be many other teams in an organization that contribute to and collaborate on content and not all of the individuals on these other teams have access to or experience with such an application.

BRIEF SUMMARY

A digital design application plugin for content updates and delivery is provided. The described plugin has an export function and an import function. The export function exports content from a SKETCH file to a different file format. The import function imports content from the different file format back into the SKETCH file.

The export function of the plugin can, when executed, direct a computing system to: in response to receiving a request to export to a named file of a particular file format different from the SKETCH file format of a specified SKETCH file, extract content items from the SKETCH file. The SKETCH file can include one or more content items such as text, shapes, images, and symbols. The SKETCH file format represents elements as nodes in a tree structure. The extraction of content items can include identifying a path of traversal of elements that represent the SKETCH file from the root node to the terminal node representing each content item; and storing, in the named file, a string representing the path of the traversal and a corresponding identifier of each element in the path, an identifier associated with a type for the content item, and the content of the content item. When the content item is a text, shape, or image element, an identifier of the content item is stored as the identifier associated with the type for the content item. When the content item is a symbol, an identifier of the content item and an identifier of the symbol is stored as the identifiers associated with the type for the content item. When the content item is a nested symbol, a combination identifier is stored as the identifier associated with the type for the content item.

The import function of the described plugin function can, when executed, direct a computing system to: in response to receiving a request to import from the named file to the specified SKETCH file, update the specified SKETCH file by parsing the named file for path string and identifiers; traversing the path of each content item in the SKETCH file identified by the string for that content item; comparing identifiers associated with that content item and the content itself to identify any changes from the named file; and modifying the content of the SKETCH file with the changes as indicated by the named file. A changelist can also be generated and stored.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A and 3B illustrate a transformation of content from a SKETCH file to a spreadsheet file.

DETAILED DESCRIPTION

A digital design application plugin for content updates and delivery is provided. The described plugin has an export function and an import function. The export function exports content from a SKETCH file to a different file format. The import function imports content from the different file format back into the SKETCH file.

Bohemian Coding's SKETCH application offers an interface to extend the core functionality of the software, through its plugin architecture. A plugin for SKETCH may be written in Cocoascript (a language that allows developers to use Cocoa and Objective-C functions through JavaScript). A plugin refers to a software component that adds a specific feature to an existing computer program. The described digital design application plugin for content updates and delivery can be used for SKETCH. Advantageously, the described plugin provides a workflow automation tool. In some implementations, the described plugin can allow users not especially familiar with the interface of SKETCH a more convenient way to modify content. By allowing extraction and editing of key elements, this affords those users the ability to work in a platform in which they are more comfortable.

The export function of the described plugin can, when executed, direct a computing system to: in response to receiving a request to export to a named file of a particular file format different from the SKETCH file format of a specified SKETCH file, extract content items from the SKETCH file. The SKETCH file can include one or more content items such as text, shapes, images, and symbols. The SKETCH file format represents elements as nodes in a tree structure. The extraction of content items can include identifying a path of traversal of elements that represent the SKETCH file from the root node to the terminal node representing each content item; and storing, in the named file, a string representing the path of the traversal and a corresponding identifier of each element in the path, an identifier associated with a type for the content item, and the content of the content item. When the content item is a text, shape, or image element, an identifier of the content item is stored as the identifier associated with the type for the content item. When the content item is a symbol, an identifier of the content item and an identifier of the symbol is stored as the identifiers associated with the type for the content item. When the content item is a nested symbol, a combination identifier is stored as the identifier associated with the type for the content item.

Once the SKETCH file is exported to the file format of the named file, any modifications to the content (and possibly fields) can be made using an appropriate content creation application with editing functionality for the file format of the named file. In some instances, online capabilities may not be available or limited for users. For instance, in high-security environments, web-based collaboration applications might not be available for use due to a firewall. The ability to select a destination formatting for content of a SKETCH file as provided by the described plugin avoids restrictions due to firewalls and supports local (or in-network) consumption of files.

The import function of the described plugin function can, when executed, direct a computing system to: in response to receiving a request to import from the named file to the specified SKETCH file, update the specified SKETCH file by parsing the named file for path string and identifiers; traversing the path of each content item in the SKETCH file identified by the string for that content item; comparing identifiers associated with that content item and the content itself to identify any changes from the named file; and modifying the content of the SKETCH file with the changes as indicated by the named file. A changelist can also be generated and stored.

In a specific implementation the different file format is a spreadsheet application file format such as an EXCEL file format. In some cases, the plugin can transform the SKETCH file to a JSON or XML file. The JSON or XML file can be sent directly into a development site, or even a live content management system. A headless content management system may be used that can become the single source of truth. The plugin architecture can then be used to pipe content directly from the content management system into the SKETCH file.

Figure 1:
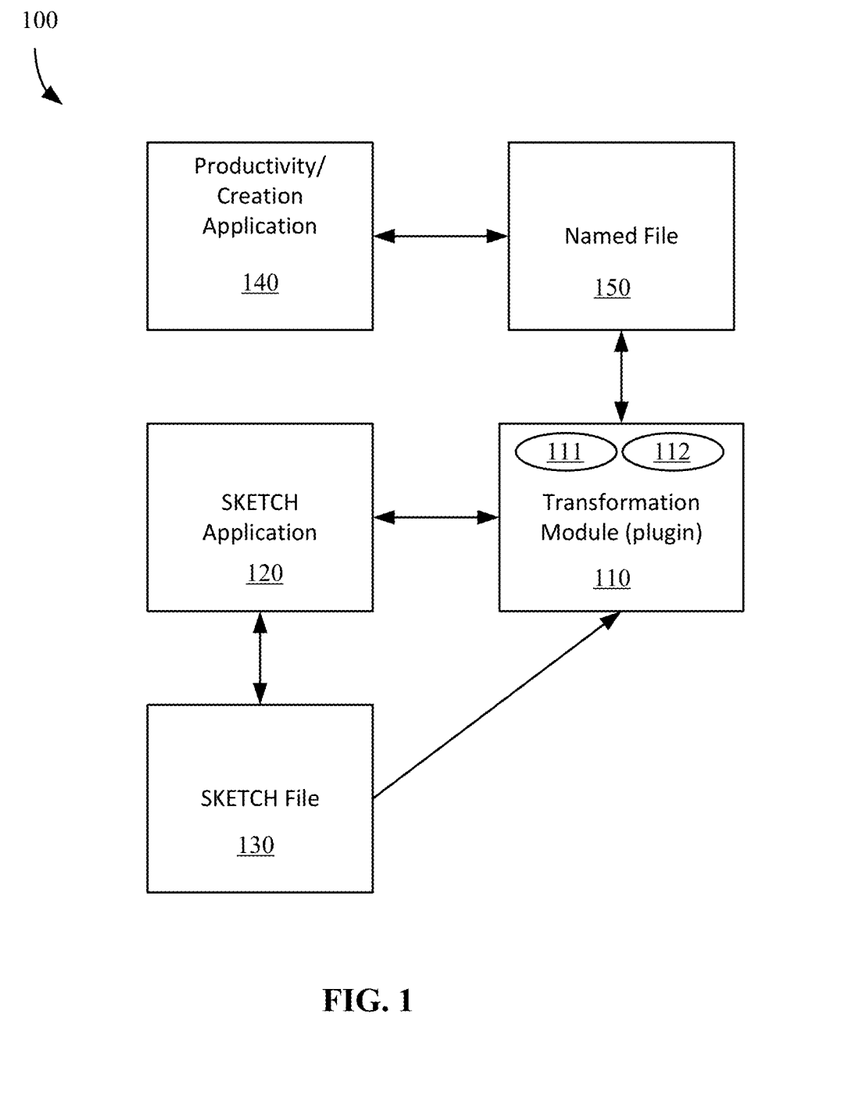
FIG. 1 illustrates an example operating environment of a plugin for content updates and delivery.

FIG. 1 illustrates an example operating environment of a plugin for content updates and delivery. The operating environment 100 can include a transformation module 110, which can include an export function module 111 and an import function module 112, a SKETCH application 120, a SKETCH file 130, a productivity/content creation application 140, and a named file 150 of a file format understandable to the productivity/content creation application 140.

Figure 4:
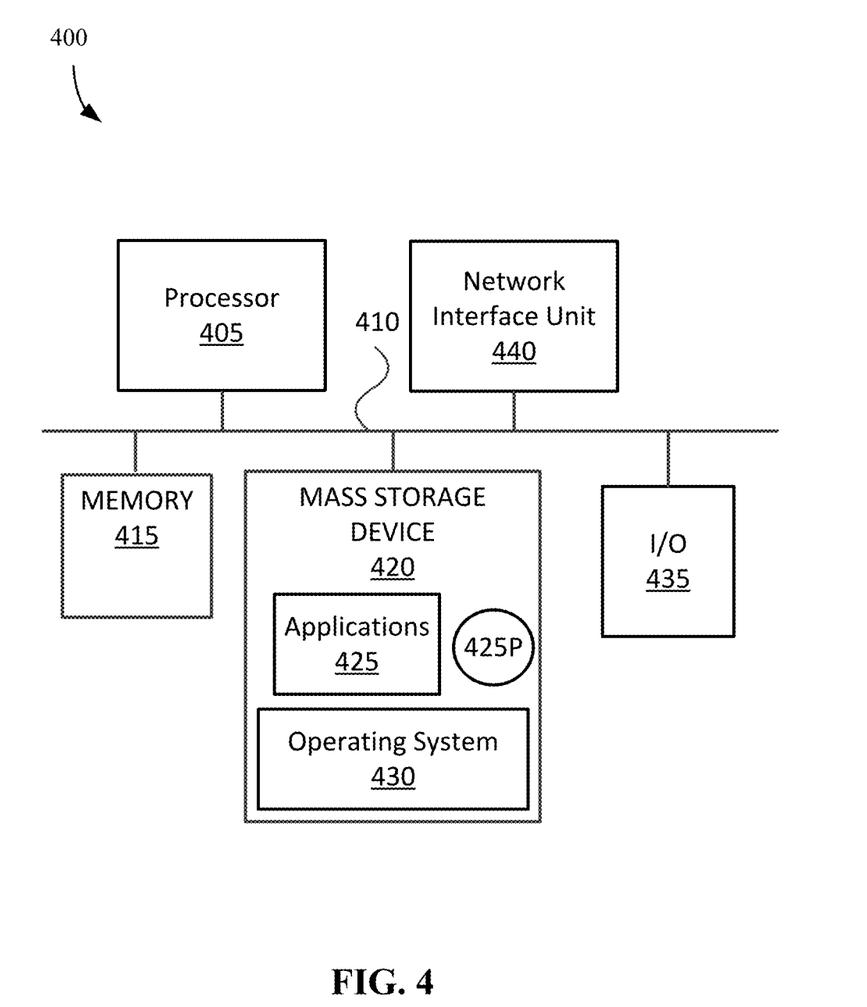
FIG. 4 shows a block diagram illustrating components of a computing device used in some embodiments.

Elements of operating environment 100 may be embodied on a computing device such as device 400 described with respect to FIG. 4. Files 130, 150 may be stored locally on the computing device or stored separately but accessible via a network interface of the computing device.

SKETCH file 130 may be interpreted by the SKETCH application 120 and rendered on a canvas interface of the SKETCH application 120 for consumption and editing by a user within the SKETCH application 120.

Communication between the transformation module 110 and the SKETCH application 140 may be carried out as well known for plugins. The module 110 can execute from within the SKETCH application and initiate either an import function 112 or an export function 111 in response to commands. Content of a SKETCH file 130 may be obtained via application programming interfaces available from SKETCH. In some cases, content of the SKETCH file 130 is read directly by the module 110. The content of the SKETCH file is exported from the SKETCH file to the named file 150 according to module 111, which may carry out process 200 such as described with respect to FIG. 2A.

The file format of the named file 150 may be a spreadsheet file (e.g., .xls, .xlsx, .ods), meta-language file format (e.g., JSON), or markup language file format (e.g., XML), as some examples. The named file can be created by the module 110 or be an existing file.

In some cases, the module can direct the named file 150 to be stored at a particular location. In some cases, the named file 150 can be stored as part of a Content Management System using any suitable file format.

Named file 150 may be interpreted by the productivity/content creation application 140 and rendered on a canvas interface of the productivity/content creation application 140 for consumption and editing by a user within the productivity/content creation application 140. Modifications to the content of the named file 150 can be made via the productivity/content creation application 140.

Updates to the content of the named file 150 can be imported back to the SKETCH file 130 via the import module 112 of the transformation module 110. For example, a user may select, while in the SKETCH application 120 to import changes or changes may be automatically imported at predetermined times. The import function 112 may be carried out according to process 250 such as described with respect to FIG. 2B.

Figure 2A:
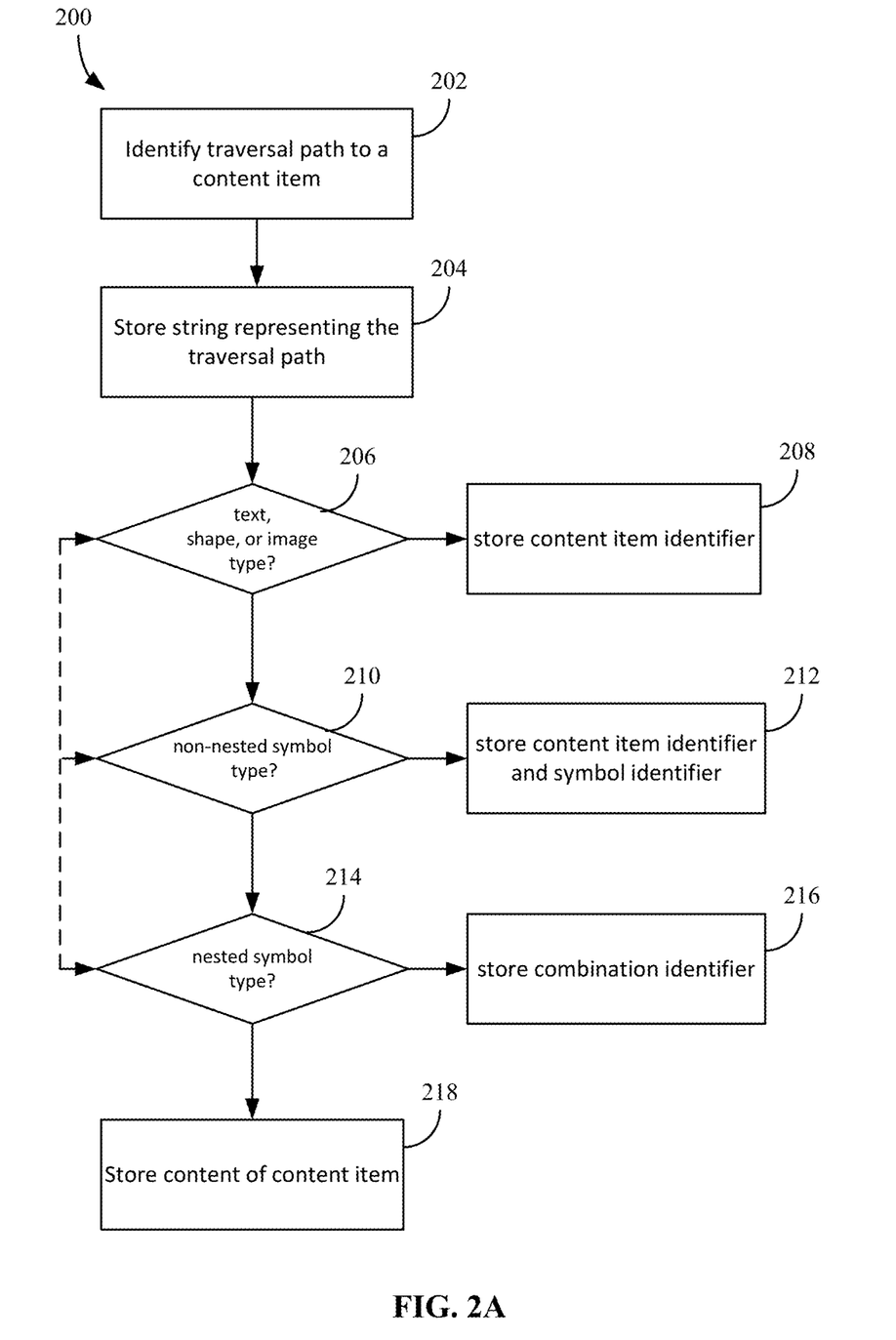
FIGS. 2A and 2B illustrate process flow diagrams for an export module and import module of a plugin for content updates and delivery, respectively.
Figure 2B:
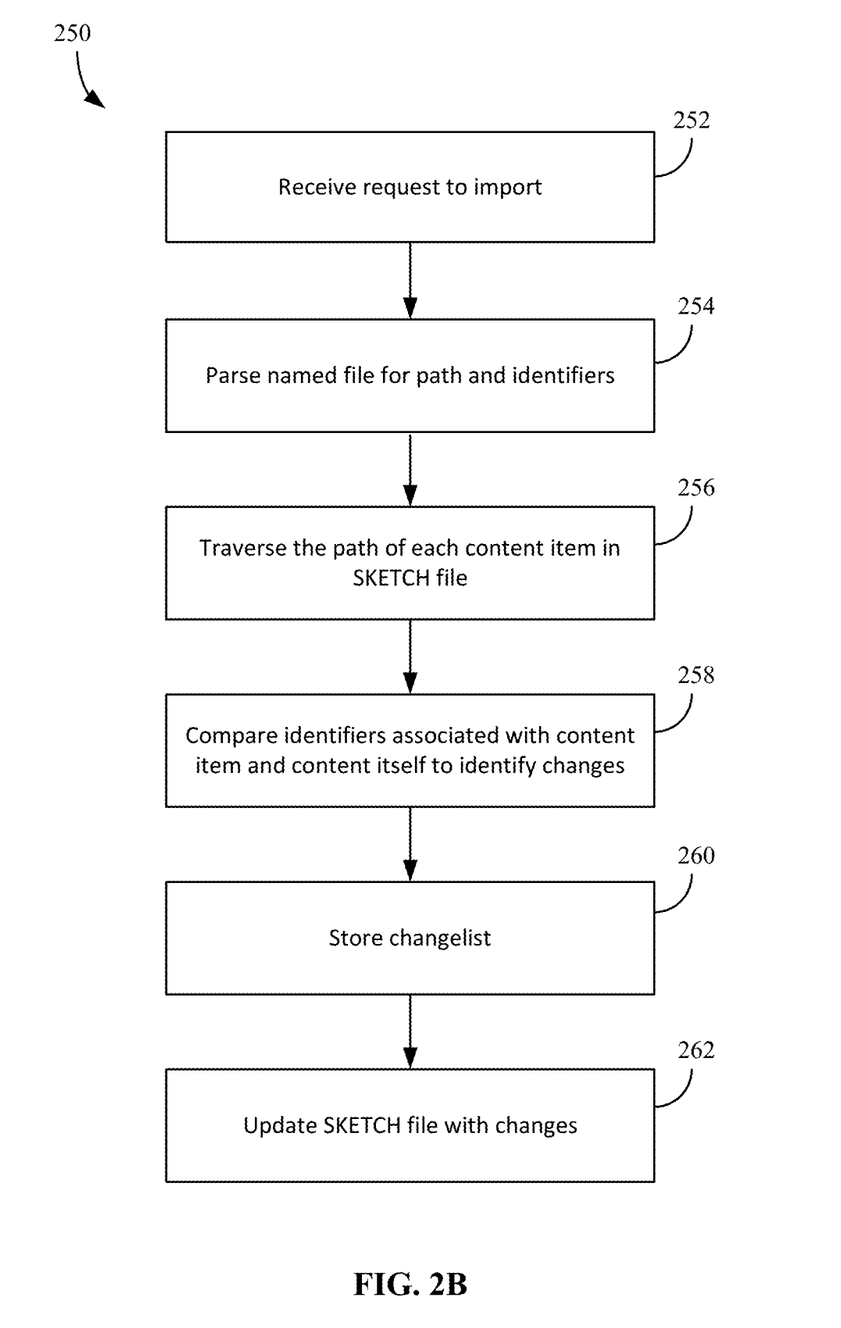

FIGS. 2A and 2B illustrate process flow diagrams for an export module and import module of a plugin for content updates and delivery, respectively.

Referring to FIG. 2A, in response to receiving a request to export to a named file of a particular file format different from the SKETCH file format of a specified SKETCH file, content items of the SKETCH file can be extracted in a manner such as illustrated by export process 200. The SKETCH file can include one or more content items such as text, shapes, images, and symbols. The SKETCH file format represents elements as nodes in a tree structure.

Export process 200 can include identifying (202) a path of traversal of elements that represent the SKETCH file from the root node to the terminal node representing each content item; and storing (204) a string representing the traversal path. The traversal can be a depth first traversal, collecting the identifiers of the nodes along the path in order to create a string representation of the path of the traversal for each content item of the SKETCH file. The export process 200 further includes extracting the identifiers for the content item, the particular identifiers depending on the type for that content item. For example, when the content item is a text, shape, or image type (206), the identifier of the content item is stored as the identifier associated with the type for the content item. When the content item is a symbol, an identifier of the content item and an identifier of the symbol is stored as the identifiers associated with the type for the content item. When the content item is a nested symbol, a combination identifier is stored as the identifier associated with the type for the content item. In addition, the content itself is stored (218).

The extracted information can thus be arranged as appropriate for flat file types either in the appropriate fields as the information is extracted or after extraction (e.g., from an intermediate state). For example, the export module can receive a name ("named file") of an existing file or a new file to be created (and optionally the file format to be used). The file format for the file may be a spreadsheet file (e.g., .xls, .xlsx, .ods), meta-language file format (e.g., JSON), or markup language file format (e.g., XML), as some examples. In some cases, a formatting suitable for a content management system may be used. The arrangement of the extracted information can be governed by certain rules, which provides an arrangement suitable for viewing by a user. A possible layout of a file transformed to a spreadsheet file can be seen in FIG. 3B.

Once the SKETCH file is exported to the file format of the named file, any modifications to the content (and possibly fields) can be made using an appropriate content creation application with editing functionality for the file format of the named file.

In some cases, changes to the named file may be automatically propagated to the SKETCH file. In some cases, a user-selected import command is expressed. Once a request for importing the information back to the SKETCH file is received. The import module can be executed.

Referring to FIG. 2B, in response to receiving a request to import from the named file to the specified SKETCH file, the specified SKETCH file can be updated in a manner such as illustrated by import process 250. Import process 250 can begin with receiving (252) the request to import. The request can include the name and optionally the location of the named file. In response to the request, the import process 250 parses (254) the named file for the path and identifiers of each content item. The path of each content item is traversed (256) in the SKETCH file; and identifiers associated with the content items and the content itself is compared to identify (258) changes. The changes can be stored (260) in a changelist. Changes identified in operation 258 can be made to the SKETCH file to update (262) the SKETCH file. For example, when identifying the changes, information for each content item in both the SKETCH file and the named file are compared. The compared information includes identifiers and the content itself. When there is a difference between the identifiers, the identifier can be updated in the SKETCH file. When there is a difference in content, the content can be updated. The changelist (which may also be referred to as a changelog) provides a record of each change identified (and performed) by the import module.

In some cases, instead of overwriting the SKETCH file, a new copy may be created. If the new copy is created, future updates may be applied to the copy.

As an illustrative example of a plugin including processes 200 and 250, as part of the export function, the plugin reads through a SKETCH file and recursively traverses the document tree, extracting all content fields. These fields are parsed, sorted and formatted. The plugin then converts this hierarchical data structure to a flat format that can be understood by Excel. The plugin then generates an Excel workbook with each sheet representing a page from the SKETCH document. The plugin also creates a "Symbols" page, which includes all SKETCH's global symbol elements. In some cases, the plugin can prompt the user to save the newly generated Excel file.

As part of the import function, the plugin will accept an updated EXCEL file, locate any changed fields and copy them back to their original position within the SKETCH document. This also include Symbols that are changed globally throughout the SKETCH document.

The plugin can also prompt the user to download a CSV log file (the "changelist") of all items that were changed, optionally including the previous values, and a report of any items that could not be found.

Figure 3A:
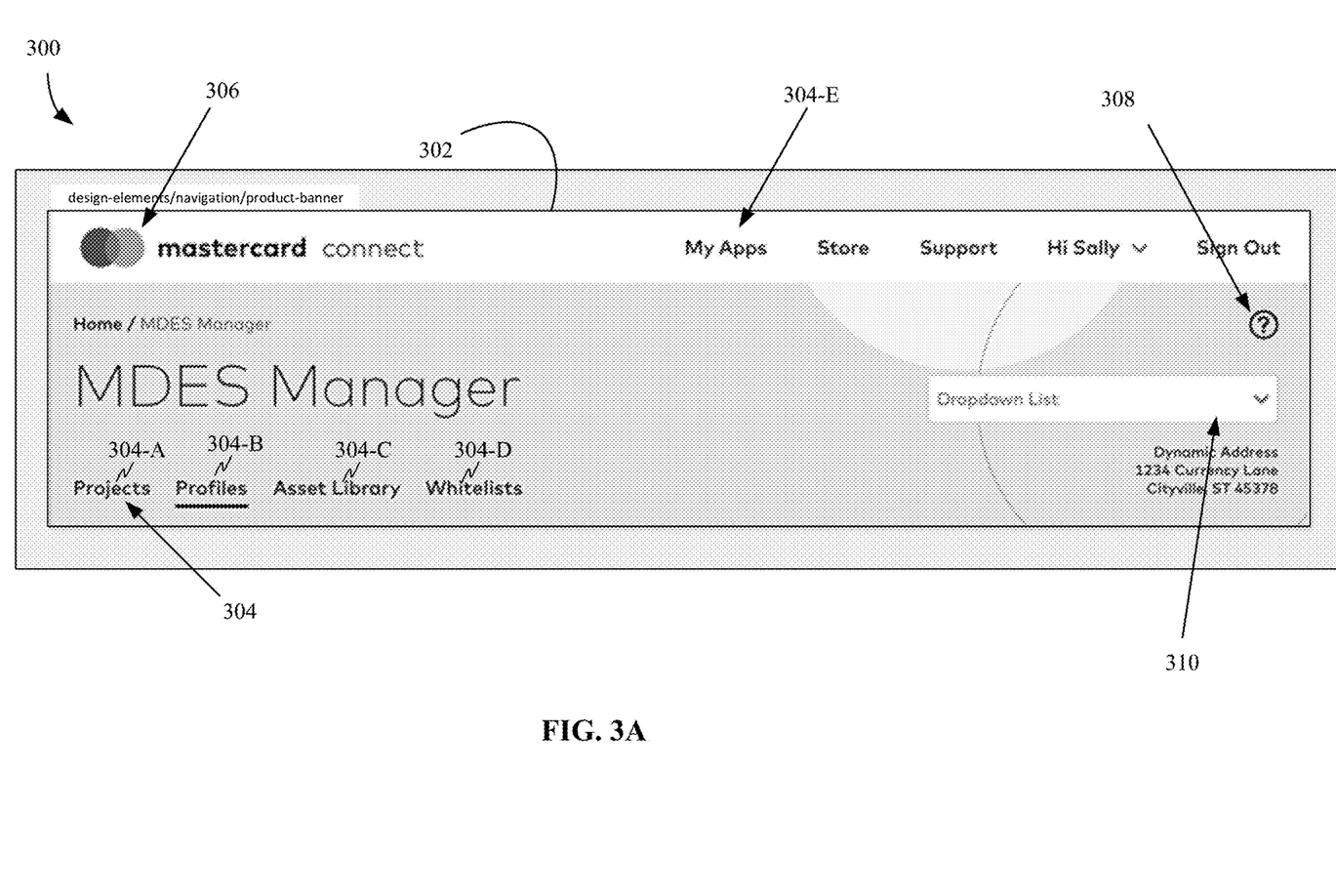
FIG. 3A shows content displayed in SKETCH.
Figure 3B:
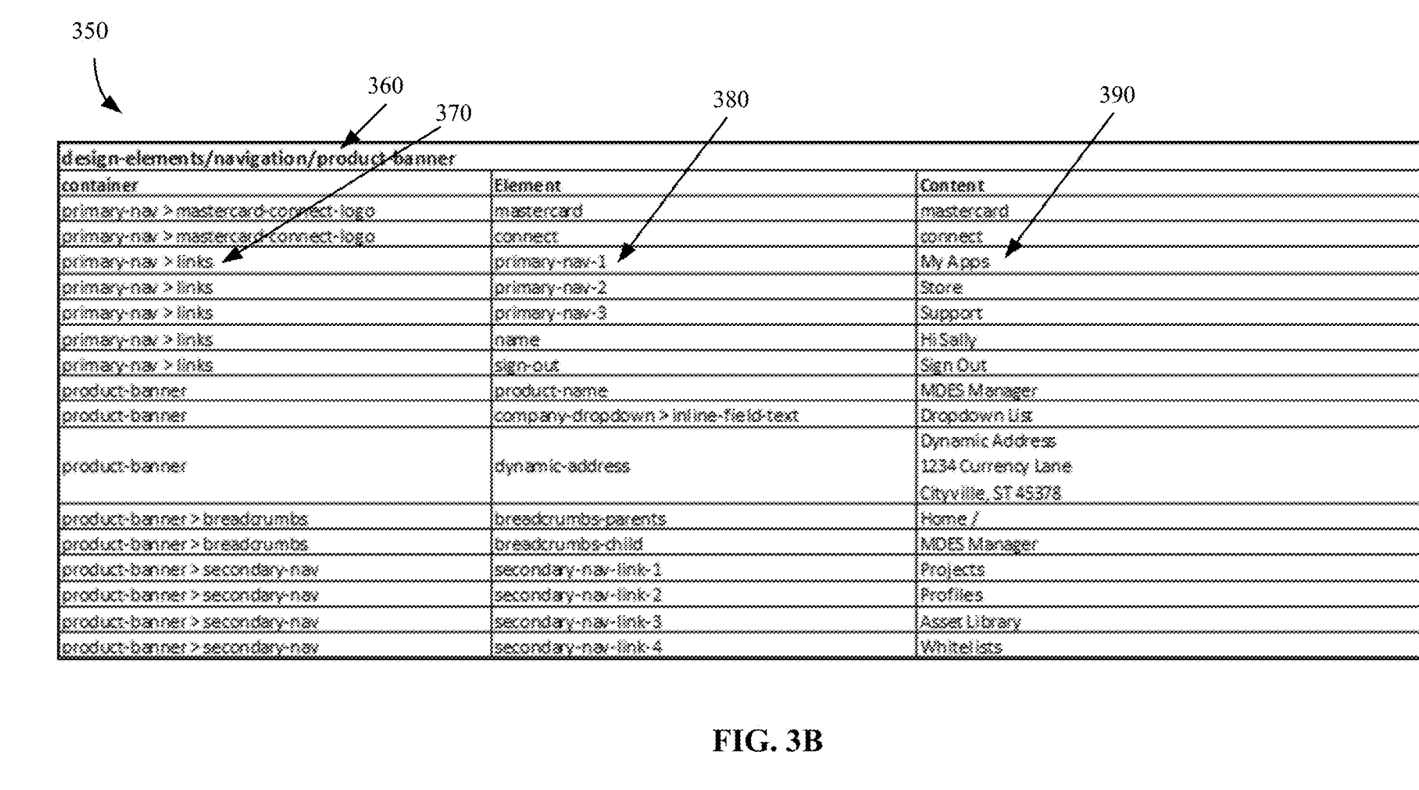
FIG. 3B shows the content displayed in EXCEL.

FIGS. 3A and 3B illustrate a transformation of content from a SKETCH file to a spreadsheet file. FIG. 3A shows content displayed in SKETCH; and FIG. 3B shows the content displayed in EXCEL.

Referring to FIG. 3A, a website banner may be designed in SKETCH. A view 300 of the banner 302 is shown. The banner 302 has a variety of elements, including but not limited to icons (e.g., for buttons) 304, images 306, symbols 308, and dropdown 310. Many of the icons may be able to be grouped into families based on characteristics. These characteristics could include background color, font, font size, behavior when hovered over or clicked. The elements in these groups can share parents in the SKETCH file. For example, the icons, Projects 304-A, Profiles 304-B, Asset Library 304-C, and Whitelists 304-D, can share a same parent because they are located in a region sharing a same background and are all representing selectable links. However, icon My Apps 304-E is part of a different family because it is part of the primary navigation region.

Turning to FIG. 3B, an example resultant file output by the plugin export module can be seen in view 350. The spreadsheet includes a table with the hierarchical information, as well as the path name. Here, the table has three headings: container, element, and content. The container column provides the container identifier. The element provides the content identifier (based on type). The content column can track the actual text displayed in the element. Accordingly, the elements seen in the banner 302 in FIG. 3A can be seen transposed here, and relationships can be maintained for ease of importing back into the SKETCH file.

A comparison between the view 300 of the SKETCH file and a view 350 of the resultant file created by the plugin export module is provided by FIGS. 3A and 3B. For example, when the extract module of the plugin traverses the tree representing the SKETCH file for the content item of icon 304 containing "My Apps" 304-E shown in view 300 of FIG. 3A, this results in a path that is represented by string 360 "design-elements/navigation/product-banner"; the container with container identifier 370 "primary-nav→links"; element identifier 380 "primary-nav-1"; and the text-type content 390 itself, "My Apps", which can be used to populate cells of the spreadsheet application as shown in view 350 of FIG. 3B.

As mentioned above, modifications to any of the containers, elements and content can be made while within the spreadsheet application. Further, the content column may be extracted and translated to another language by any suitable translation service. For example, the English words may be transmitted to a suitable translation service (available locally or over a network) along with a requested language, such as French or Chinese, and the translated words returned to the spreadsheet application. Then, when the import module of the plugin is executed, the SKETCH file can reflect the translated text.

In some cases, the translation may be possible in SKETCH via the plugin, where the plugin extracts the content items, calls a translation service to translate the content of the content items, populates a new named file with the translation received from the translation service and imports the translated content back to the SKETCH file.

FIG. 4 shows a block diagram illustrating components of a computing device used in some embodiments. It should be understood that aspects of the system described herein are applicable to both mobile and traditional desktop computers, as well as server computers and other computer systems. Components of computing device 400 may represent a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen as some examples. Accordingly, more or fewer elements described with respect to computing device 400 may be incorporated to implement a particular computing device.

Referring to FIG. 4, a computing device can include at least one processor 405 connected to components via a system bus 410; a system memory 415 and a mass storage device 420. A processor 405 processes data according to instructions of one or more application programs 425, and/or operating system 430. Examples of processor 405 include general purpose central processing units (CPUs), graphics processing units (GPUs), field programmable gate arrays (FPGAs), application specific processors, and logic devices, as well as any other type of processing device, combinations, or variations thereof. Processor 405 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor) and network connectivity components (e.g., including network interface 440).

The one or more application programs 425 may be loaded into the mass storage device 420 and run on or in association with the operating system 430. Examples of application programs 425 include digital design applications such as SKETCH and content creation applications such as word processing programs and spreadsheet programs. Instructions 425P for the plugin described herein can also be stored on the mass storage device 420. Other application programs may be loaded into the mass storage device 420 and run on the device, including various client and server applications.

It can be understood that the mass storage device 420 may involve one or more memory components including integrated and removable memory components and that one or more of the memory components can store an operating system. Examples of mass storage device 420 include removable and non-removable storage media including random access memory, read only memory, magnetic disks, optical disks, CDs, DVDs, flash memory, magnetic cassettes, magnetic tape, magnetic disk storage or other magnetic storage devices, or any other suitable storage media.

The system memory 415 may include a random access memory ("RAM") and/or a read-only memory ("ROM"). The RAM generally provides a local storage and/or cache during processor operations and the ROM generally stores the basic routines that help to transfer information between elements within the computer architecture such as during startup.

A synchronization application may also be included and reside as part of the application programs 425 for interacting with a corresponding synchronization application on a host computer system (such as a server) to keep the information stored in a non-volatile storage (such as of mass storage device 420) synchronized with corresponding information stored at the host computer system.

The system can further include user interface system 435, which may include input/output (I/O) devices and components that enable communication between a user and the computing device 400. User interface system 435 can include one or more input devices such as, but not limited to, a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 435 may also include one or more output devices such as, but not limited to, display screen(s), speakers, haptic devices for tactile feedback, and other types of output devices. In certain cases, the input and output devices may be combined in a single device, such as a touchscreen display which both depicts images and receives touch gesture input from the user.

The network interface 440 allows the system to communicate with other computing devices, including server computing devices and other client devices, over a network. The network interface 440 can include a unit to perform the function of transmitting and receiving radio frequency communications to facilitate wireless connectivity between the system and the "outside world," via a communications carrier or service provider. Transmissions to and from the network interface 440 are conducted under control of the operating system 430, which disseminates communications received by the network interface 440 to application programs 425 and vice versa.

In various implementations, data/information stored via the system may include data caches stored locally on the device or the data may be stored on any number of storage media that may be accessed by the device via the network interface 440 or via a wired connection between the device and a separate computing device associated with the device, for example, a server computer in a distributed computing network, such as the Internet. As should be appreciated such data/information may be accessed through the device via the network interface 440 or a distributed computing network. Similarly, such data/information may be readily transferred between computing devices for storage and use according to well-known data/information transfer and storage means, including electronic mail and collaborative data/information sharing systems.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

It should be understood that as used herein, in no case do the terms "storage media," "computer-readable storage media" or "computer-readable storage medium" consist of transitory carrier waves or propagating signals. Instead, "storage" media refers to non-transitory media.

he functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. One or more computer-readable storage media having instructions thereon that when executed by a computing device, direct the computing device to at least:
in response to receiving a request to export to a named file of a particular file format different from a SKETCH file format of a specified SKETCH file:
extract content items from the specified SKETCH file, wherein the content items include text elements, shape elements, image elements, symbols, or a combination thereof, each extracted content item having a path string defining a path in a file structure of the specified SKETCH file to the content item and one or more identifiers; and
insert the extracted content items into the named file of the particular file format for editing within an appropriate application; and
in response to receiving a request to import from the named file to the specified SKETCH file:
parse the named file for the path string and the one or more identifiers of an extracted content item in the named file;
traverse the specified SKETCH file according to the path obtained from the named file for the content item corresponding to that extracted content item in the named file;
compare identifiers associated with that extracted content item in the named file and the content item in the specified SKETCH file itself to identify any changes from the named file; and
modify the content item of the specified SKETCH file with the changes as identified from the named file.

2. The media of claim 1, wherein the instructions to extract the content items direct the computing device to:
identify the path of traversal of elements that represent the specified SKETCH file from a root node to a terminal node representing each content item; and
store, as the path string in the named file, a string representing the path of the traversal, the one or more identifiers, and the content of the content item.

3. The media of claim 2, wherein when the content item is a text, shape, or image element, the one or more identifiers comprises an identifier of the content item;
wherein when the content item is a symbol, the one or more identifiers comprises an identifier of the content item and an identifier of the symbol; and
wherein the content item is a nested symbol, the one or more identifiers comprises a combination identifier.

4. The media of claim 1, further comprising instructions that direct the computing device to generate a changelist based on the changes from the named file.

5. The media of claim 1, wherein the particular file format of the named file is a spreadsheet application file format.

6. The media of claim 1, wherein the particular a file format of the named file is XML.

7. The media of claim 1, wherein the particular file format of the named file is JSON.

8. A method for content updates and delivery, comprising:
in response to receiving a request to export to a named file of a particular file format different from a SKETCH file format of a specified SKETCH file:
extracting content items from the specified SKETCH file to the named file, wherein the content items include text elements, shape elements, image elements, symbols, or a combination thereof, each extracted content item having a path string defining a path in a file structure of the specified SKETCH file to the content item and one or more identifiers; and
inserting the extracted content items into the named file of the particular file format for editing within an appropriate application; and
in response to receiving a request to import from the named file to the specified SKETCH file:
parsing the named file for the path string and the one or more identifiers of an extracted content item in the named file;
traversing the specified SKETCH file according to the path obtained from the named file for the content item corresponding to that extracted content item in the named file;
comparing identifiers associated with that extracted content item in the named file and the content item in the specified SKETCH file to identify any changes from the named file; and
modifying the content item of the specified SKETCH file with the changes as identified from the named file.

9. The method of claim 8, wherein extracting the content items comprises:
identifying the path of traversal of elements that represent the specified SKETCH file from a root node to a terminal node representing each content item; and
storing, as the path string in the named file, a string representing the path of the traversal, the one or more identifiers, and the content of the content item.

10. The method of claim 9, wherein when the content item is a text, shape, or image element, the one or more identifiers comprises an identifier of the content item;
wherein when the content item is a symbol, the one or more identifiers comprises an identifier of the content item and an identifier of the symbol; and
wherein the content item is a nested symbol, the one or more identifiers comprises a combination identifier.

11. The method of claim 8, further comprising generating a changelist based on the changes from the named file.

12. The method of claim 8, wherein the particular file format of the named file is a spreadsheet application file format.

13. The method of claim 8, wherein the particular file format of the named file is XML.

14. The method of claim 8, wherein the particular file format of the named file is JSON.

15. The method of claim 8, further comprising:
in response to receiving a request to translate content of the specified SKETCH file:

extracting the content items;
calling a translation service to translate the content of the content items;
populating a new named file with a translation received from the translation service; and
importing the translated content back to the specified SKETCH file.

\* \* \* \* \*